(12) United States Patent
Arnason

(10) Patent No.: US 11,985,986 B2
(45) Date of Patent: May 21, 2024

(54) METHOD FOR FREEZING FOOD ITEMS

(71) Applicant: Skaginn HF., Akranes (IS)

(72) Inventor: Ingolfur Arnason, Akranes (IS)

(73) Assignees: LAMBHUSASUND EHF., Akranes (IS); SKAGINN HF., Akranes (IS)

( * ) Notice: Subject to any disclaimer, the term of this patent is extended or adjusted under 35 U.S.C. 154(b) by 636 days.

(21) Appl. No.: 17/267,152

(22) PCT Filed: Aug. 8, 2019

(86) PCT No.: PCT/IS2019/050008
§ 371 (c)(1),
(2) Date: Feb. 9, 2021

(87) PCT Pub. No.: WO2020/031215
PCT Pub. Date: Feb. 13, 2020

(65) Prior Publication Data
US 2021/0307345 A1    Oct. 7, 2021

(30) Foreign Application Priority Data
Aug. 9, 2018   (IS) .......................................... 050231

(51) Int. Cl.
*A23B 4/06*     (2006.01)
*A22C 25/08*    (2006.01)
*A22C 25/17*    (2006.01)
*A22B 3/08*     (2006.01)

(52) U.S. Cl.
CPC .............. *A23B 4/064* (2013.01); *A22C 25/08* (2013.01); *A22C 25/17* (2013.01); *A22B 3/083* (2013.01)

(58) Field of Classification Search
CPC ......... A23B 4/064; A22C 25/08; A22C 25/17; A22B 3/083
See application file for complete search history.

(56) References Cited

U.S. PATENT DOCUMENTS 3,097,099 A * 7/1963 Beckmann ............... A23B 4/00
                                                        426/418
4,700,547 A * 10/1987 Hayashi ................... A23B 4/08
                                                         62/65
6,825,446 B1    11/2004 Arnason
(Continued)

FOREIGN PATENT DOCUMENTS

GB      2464347 A      4/2010
WO   2012147109 A2    11/2012
(Continued)

OTHER PUBLICATIONS

International Search Report and Written Opinion dated Nov. 12, 2019 for corresponding International Application No. PCT/IS2019/050008.
(Continued)

*Primary Examiner* — Anthony J Weier
(74) *Attorney, Agent, or Firm* — TAROLLI, SUNDHEIM, COVELL & TUMMINO L.L.P.

(57) ABSTRACT

Method and device for freezing food items in a gradual process, where the food items are first put through under-cooling before the food items are placed in a container or receptacle for freezing. The method and device are particularly suitable for freezing freshly slaughtered and bled fish for later processing.

7 Claims, 2 Drawing Sheets

(56) References Cited

U.S. PATENT DOCUMENTS

| | | | |
|---|---|---|---|
| 10,357,805 B2* | 7/2019 | Arnason | B07C 5/342 |
| 11,602,133 B2* | 3/2023 | Arnason | A01K 61/95 |
| 2007/0128338 A1* | 6/2007 | Valdes Edwards | A23B 4/00 |
| | | | 426/643 |
| 2008/0171117 A1* | 7/2008 | Mixon | A61L 2/235 |
| | | | 134/41 |
| 2010/0083687 A1 | 4/2010 | Handa | |
| 2019/0116812 A1* | 4/2019 | Arnason | A23B 4/023 |
| 2021/0153514 A1* | 5/2021 | Arnason | A23B 4/18 |
| 2022/0202025 A1* | 6/2022 | Arnason | A22C 9/005 |
| 2022/0386632 A1* | 12/2022 | Arnason | A22C 25/08 |
| 2023/0051759 A1* | 2/2023 | Arnason | A23B 4/0053 |
| 2023/0309571 A1* | 10/2023 | Arnason | A22C 25/00 |
| | | | 426/231 |

FOREIGN PATENT DOCUMENTS

| | | |
|---|---|---|
| WO | 2014174535 A1 | 10/2014 |
| WO | 2016170550 A1 | 10/2016 |
| WO | 2017187457 A1 | 11/2017 |

OTHER PUBLICATIONS

Iceland Search Report dated Nov. 23, 2018 for corresponding Iceland Patent Application No. 050231.

* cited by examiner

METHOD FOR FREEZING FOOD ITEMS

RELATED APPLICATIONS

The present application is a U.S. National Stage application under 35 USC 371 of PCT Application Serial No. PCT/IS2019/050008, filed on 8 Aug. 2019; which claims priority from IS Patent Application No. 050231, filed 9 Aug. 2018, the entirety of both of which are incorporated herein by reference.

FIELD OF THE INVENTION

The invention provides a method for cooling, transporting and storing food items using little or no ice for the transport and the storage. Furthermore, the present invention provides a new method for delivering a fresh food item to the market with reduced water footprint and carbon footprint.

BACKGROUND

A continuous development of food processing, such as processing of fish products is always on demand with the focus on for instance to increase utilization and value of products as well as meeting demands for quality after processing. The time period from when a caught fish ends up on the deck of a fishing ship and to the time the fish has been processed and is ready for packing or the market can vary depending on where the processing is performed. In many cases the processing is done on land, which requires storing the fish at sea and during transport to the factory. The fish may either be transported cold or frozen, depending on type of fish, time and type of further processing.

All handling and transport has effect on the quality of the fish, especially on soft and fragile fish. As an example, slaughtered salmon is chilled or frozen on ice in Styrofoam boxes on ice. The ice does damage to the surface of the fish and the ice needs to be melted and dealt with in an environmentally friendly manner and the boxes need to be washed and transported back or destroyed. This is both costly and time consuming, leaving a large environmental footprint on every unit of caught and transported fish.

Traditionally, when freezing fish at sea, the fish is frozen in vertical plate freezers. By freezing food items in vertical receptacles, an increased load is placed on the food items at the bottom of the receptacle, which may damage and reduce the value of the food items at the bottom of the receptacle. De-riming or defrosting of the freezing system for vertical freezing is also very time and energy consuming, but in most systems defrosting needs to be performed every 4 hours.

WO 2014/174535 discloses a method for processing undercooled fish, chilled by super-chilling using a saline solution and slurry ice to bring the fish to an undercooled state and processing the fish after being brought to an undercooled state. This technology has the drawback that the temperature of the slurry is at the freezing point of the slurry solution determined by the salt concentration and the temperature of the surface and the inside of the fish will not be the same. Furthermore, the temperature of the slurry solution being at its freezing point will result in the surface of the fish to freeze and/or create form an ice shell.

US 2010/0083687 discloses a device for providing a way to freeze super-cooled food items. The device is a refrigerator for performing a frozen food preservation method uses the cold air generated by a cooler, where the refrigerator has a supercooling case for keeping food items in a super-cooled state maintaining the food items un-frozen at a temperature equal to or less than the freezing point of the food items for a predetermined period of time.

SUMMARY OF THE INVENTION

The present invention provides a method and device for freezing food items in a gradual process, where the food items are first put through sub-chilling or under-cooling before the food items are placed in a container or receptacle for freezing. The method and device of the present invention are particularly suitable for freezing freshly slaughtered and bled fish for later processing. The present invention provides a solution for increasing the value of food items, such as fish, by performing a novel stepwise cooling and freezing method where the food items are sub-chilled by treating the fish in a salt controlled and temperature controlled solution in cooling devices providing agitation or movement of the food items during the cooling process. Thereafter, the food items are allowed to rime or temperature balance before they are frozen to allow the temperature at the surface of the food items to even with and cooling the inner most part of the food items. By packing the food items after sub-chilling and having been allowed to temperature balance, the food items have fully expanded before freezing and with packing into trays or lateral packing units the food items will not be pressure damaged during freezing.

One of the embodiments disclosed herein uses a spiral pump to bring the food items to an under-cooled state. In such embodiments, a predetermined amount of food items is introduced into the first winding of a spiral pump together with a predetermined and calculated amount of fluid at a desired temperature and salt concentration. After the items have passed through the spiral pump, the items continue to a device for temperature balancing, the liquid is collected and optionally filtered before it is passed through a heat exchange system on its way to a fluid reservoir where it is maintained until it is pumped back into the spiral pump.

One of the embodiments disclosed herein uses a spiral pump to bring the food items or newly slaughtered animals, such as fish or chicken to an under-cooled state. The rotating movement or optionally a rocking movement of the spiral tubing of the pump allows the fluid to flow alongside the product, thus achieving improved efficiency in sub-chilling the food items. Therefore, the fluid flow has the same effect as wind-cooling and faster because of all cooling and heating functions. This may be referred to as flow-chilling.

It is an object of the present invention to overcome or ameliorate the aforementioned drawbacks of the prior art and to provide an improved and/or alternative and/or additional method for cooling and freezing food items, such as fish, for storing and/or transporting. It is one preferred object of the present invention to provide a method and device for freezing food items such as fish comprising undercooling the product by submerging in salt solution at a sub-zero temperature at or above the freezing point of the solution before freezing the objects in receptacles. In one preferred object of the present invention a method is provided for freezing food items, where the food item has been brought to an under-cooled state using a salt- and temperature controlled solution before freezing. Moreover, it is a preferred object of the present invention to provide a method, preferably designed to transport frozen food items where the food items are allowed to rime or time for temperature balancing before they are frozen. The solution of the present invention further provides a method and device for freezing food items, where the quality of the fish is better maintained during the cooling, freezing and storing process and where the thawing of the frozen food items is easier due to how the items are frozen.

The object(s) underlying the present invention is (are) particularly solved by the features defined in the independent claims. The dependent claims relate to preferred embodiments of the present invention. Further additional and/or alternative aspects are discussed below.

Thus, at least one of the preferred objects of the present invention is solved by a method for freezing food items. The method comprises the steps of a) receiving food items, b) bringing the food items to an under-cooled state in salt-controlled and temperature-controlled liquid or solution in at least one first container, where: i) the salt concentration of the solution is set and a temperature of the solution maintained such that the temperature is higher than the freezing point of the solution, and ii) providing substantially continuous movement of the food items in the solution during the step of bringing the food items to an under-cooled state. The method further comprises the steps of c) subjecting the food items to a temperature balancing step to allow the food items to rime, d) transferring the food items to receptacle for freezing, and e) bringing the food items to a temperature between 4-24° C. for storage before processing.

The present invention provides a new method where the combination of flow-chilling and sub-chilling in 2 steps prior to freezing results in frozen food items which are better suited for further processing after thawing. The step of allowing the food items to temperature balance between the sub-chilling and the freezing includes a condition where the food items rime which in return reduces sticking between individual food items during freezing. This makes thawing more efficient and less harsh on the food items reducing loss of quality. In cases where the food items are fish, the step of sub-chilling freshly slaughtered fish is important as pre-rigor fish does not take up salt, but the sub-chilling step requires treating the fish in a salt controlled and temperature controlled solution.

The method of the present invention provides a way to gradually freeze fresh food items, such as freshly caught and slaughtered fish in a manner where the food items are first cooled down by sub-chilling methods and allowed to rime or temperature balance before it is subjected to a freezing step. The method requires cooling the food item by a cooling process resulting in under-cooling of the food items and in case of fish, directly after it has been slaughtered, bringing it to an under-cooled state in a salt-controlled and temperature-controlled solution. The salt concentration is chosen which determines a freezing point of the solution and the temperature of the solution is maintained or manually set substantially constant at a temperature which is higher than the freezing point of the solution. The new method provides conditions where the temperature at the surface of the food items and the inside of the meat is substantially the same. By using the present method, the salt concentration and temperature of the solution provides conditions at the surface of the food items preventing any shell or crust formation at the surface during the cooling process allowing more effective heat transfer and thus more effective cooling of the flesh/fish/meat to bring the food items to a desired temperature. In order to further prevent shell or crust formation at the surface of the food items during the cooling process, a movement of the food item is maintained in the solution during the under-cooling process.

In some embodiments of the present invention, the following features may be employed: a) using a salt-controlled and temperature-controlled solution at a set temperature and a salt concentration to set the freezing point of the solution below the set temperature of the solution, such that the salt melts any formation of a shell or crust at the surface of the wet food item, and thereby bringing the food items to a desired temperature at or near the phase transition of freezing without freezing the food items, b) moving the food items around in the solution during the undercooling process to prevent the food item from freezing or hardening, c) allowing the food items to rime during a temperature balancing step as the chilled food items take in humidity from the surroundings as they are colder than their surroundings, and d) placing the food items in trays or boxes and freezing them for storage and transportation.

At least one of the preferred objects of the present invention is solved by an apparatus for freezing food items. The apparatus comprises a device for bringing the food items to an under-cooled state in salt-controlled and temperature-controlled liquid, a device or means for allowing temperature balancing of the food items for a predetermined time period, a device or receptacle for storing or holding the food items during freezing, and a device for freezing the food items in said boxes or trays.

At least one of the preferred objects of the present invention is solved by a method for freezing whole fish. The method comprises the steps of
  a) receiving live fish from a catch or a farm
  b) slaughtering the fish,
  c) transporting the fish to a first spiral pump for bleeding in liquid at high temperature,
  d) transporting the fish out of the first spiral pump and through a liquid/fish separation device,
  e) transporting the fish to a second spiral pump or first cooling tank for bringing the fish to an under-cooled state in salt-controlled and temperature-controlled liquid by:
    i) determining the salt concentration of the solution and maintaining the temperature of the solution such that the temperature is higher than the freezing point of the solution, and
    ii) providing substantially continuous movement of the fish in the solution during the step of bringing the fish to an under-cooled state,
  f) subjecting the fish to a temperature balancing step to allow the fish to rime,
  g) transferring the fish to receptacle for freezing, and
  h) bringing the fish to a temperature between −4 and −24° C. for storage before processing.

In some embodiments for freezing fish, step e) is performed in a salt-controlled and temperature-controlled solution in at least two steps of:
  i) Transporting the fish to a second spiral pump or first cooling tank in first salt-controlled and temperature controlled solution having a salt concentration in the range from 0.1 to 10% and a temperature in the range from +1 to −3° C., where the salt concentration and set temperatures of the salt-controlled and temperature controlled solution brings the homogenous temperature of the fish to +2 to −1° C., and
  ii) transferring the fish to a third spiral pump or second cooling tank or a second section of the first cooling tank in a second salt-controlled and temperature controlled solution having a salt concentration in the range from 1 to 20% and a temperature in the range from −1 to −12° C., where the salt concentration and set temperatures of the salt-controlled and temperature controlled solution brings the homogenous temperature of the fish to −0.1 to −3° C.

In some embodiments for freezing fish the liquid from the one or more spiral pumps and the one or more cooling tanks or different sections of the cooling tanks (treatment device) is separated from fish after it is transported from the treatment device and where the liquid is optionally filtered before it is passed through a heat exchanging device before it is re-routed to the treatment device for further use.

DESCRIPTION OF THE INVENTION

In the present context the term "under-cooling" or "sub-chilling" refers to the process or method of bringing fish to a desired temperature at or near the phase transition of freezing the fish without freezing the fish, and generally below the freezing point of water (0° C.). Furthermore, these terms refer to a fish or fish product being brought to or kept at a desired temperature at or near the phase transition of freezing the fish without freezing the fish, such as a temperature below 0° C. (sub-zero conditions), such as preferably at or below −0.2° C., or more preferably at or below −0.5° C., or at or below −0.7° C., or at or below −0.8° C., such as at or below −1.0° C., such as at or below −1.5° C.

In the present context the term "temperature balancing" refers to the food items obtaining the same temperature from surface and through the flesh to the inside. More specifically the food items are brought to a homogenous temperature in the range between −0.2 and −4.0° C., where the term "homogenous temperature" refers to equalised average temperature.

In the present context the term "food items" refers to freshly slaughtered fish, such as but not limited to salmon, trout, cod, haddock, pollock, catfish, ling, blue ling, tusk, monkfish, carp, bass, bream, turbot, sea bass, sole, milkfish, grey mullet, grouper, sea bream, halibut, flounder, Japanese flounder, and freshly slaughtered chicken or meet products from freshly slaughtered beef, pork and sheep/lamb.

In the present context the salt-controlled and temperature-controlled solution/liquid is a cooling medium for storing or transferring food items in during the cooling process of the food items. By determining the salt concentration of the solution the freezing point of the solution is chosen. Thereby the temperature of the solution is maintained or manually set substantially constant at a temperature being higher than the freezing point of the solution. The salt-controlled and temperature-controlled solution/liquid provides conditions where the temperature at the surface of the food items and the inside of the food items is substantially the same providing conditions at the surface of the wet food product preventing any shell or crust formation at the surface allowing thereby providing more effective heat transfer and thus more effective cooling of the food items, such as flesh/fish/meat.

In the present context the term "fish" or "whole fish" relates to a fish which is either freshly caught and unprocessed at all or cut and/or bled and/or gutted and/or washed and/or graded and/or de-headed and/or the tail has been removed or any combination thereof.

In the present context the terms "solution" or "liquid" or "fluid" all relate to the liquid used for treating the food items in spiral pumps or cooling tanks before freezing.

In the present context the term "receptacle" refers to any means of holding or storing food items during freezing and transport, such as but not limited to tubs or bulk containers for transporting fish, trays, plastic or cardboard boxes.

In one embodiment method of cooling and storing and/or transporting food items comprises undercooling the product in a solution being agitated in order to prevent formation of ice shell or crust on the product in at least two steps of:
  i) placing the food items in first salt-controlled and temperature controlled solution having a salt concentration in the range of 0.1-10% and a temperature within the range of +1 to −3° C., and preferably in the range from −0.5 to −3° C. where the salt concentration and set temperatures of the salt-controlled and temperature controlled solution brings the homogenous temperature of the food item to a temperature in the range from +2 to −1° C., and more preferably to a temperature in the range from 0 to −1° C.
  ii) transferring the food items to a second salt-controlled and temperature controlled solution having a salt concentration of 1-20% and a temperature within the range from −1 to −12° C., where the salt concentration and set temperatures of the salt-controlled and temperature controlled solution brings the homogenous temperature of the food item to a value in the range from −0.1 to −3° C., and preferably within the range −0.5 to −3° C., such as about −1° C., or about −1.5° C.

In the above mentioned first under-cooling step (i) the salt content of the solution is preferably in the range 1-5%, such as in a range from about 1% or from about 1.5% or from about 2%, to about 5%, or to about 4% or to about 3.5%, such as a salt content of about 1.5%, or about 2% or about 2.5% or about 3%. The solution is maintained at a temperature within a range from about +1° C. but preferably from about 0° C., and more preferably from about −0.5° C., such as from about −1° C. such as from about −1.5° C., to about −3° C., such as to about −2.5° C. such as to about −2° C. In some embodiments the food item is cooled in this first under-cooling step for a period of time within the range from about 10 minutes, but more preferably from about 15 minutes such as from about 20 minutes or from about 25 minutes or from about 30 minutes, to about 75 minutes, or to about 65 minutes or to about 60 minutes or to about 55 minutes or to about 50 minutes or to about 45 minutes, such as for about 30 minutes or for about 40 minutes or for about 45 minutes or for about 50 minutes or for about 60 minutes.

In the second cooling step the salt concentration is preferably within a range from about 1%, such as from about 2% such as from about 3% such as from about 4% or from about 5%, to about 20%, or to about 15% or to about 12% such as to about 10% such as to about 8% or to about 7%, such as a salt content of about 5%, or about 6% or about 7% or about 8%. The solution is preferably maintained at a temperature within a range from about −1° C. but preferably from about −1.5° C., and more preferably from about −2° C., such as from about −2.5° C. such as from about −3° C., to about −12° C., such as to about −10° C. such as to about −8° C., such as to about −7° C. such as to about −6° C., such as a temperature of about −2° C., or about −3° C., or about −4° C. In some embodiments the food item is cooled in the second under-cooling step for a period of time within the range from about 6 minutes, but more preferably from about 8 minutes such as from about 10 minutes or from about 12 minutes or from about 15 minutes, to about 45 minutes, or to about 35 minutes or to about 30 minutes or to about 25 minutes or to about 20 minutes or to about 15 minutes, such as for about 10 minutes or for about 15 minutes or for about 20 minutes or for about 50 minutes or for about 60 minutes.

In one embodiment the food items are undercooled in step b) of the method until the food items have reached a homogenous temperature within a range from about −3° C. to about −0.1° C., and preferably within the range from about −2° C. to about −0.1° C.

In one embodiment the food items are selected from freshly slaughtered fish, freshly slaughtered chicken, beef, pork and lamb meat products.

In one embodiment the food item is fish selected from salmon, trout, cod, haddock, pollock, catfish, ling, blue ling, tusk, monkfish, carp, bass, bream, turbot, sea bass, sole, milkfish, grey mullet, grouper, sea bream, halibut, flounder, Japanese flounder.

In one embodiment the fish is gutted and/or bled prior to step b). In such an embodiment the bleeding step is performed in a tank or spiral pump or in a cooling tank having a spiral shaped blade to advance the items forward and to agitate the items during the process.

In one embodiment the fish is processed in between the at least two steps of undercooling the fish or fish products.

In one embodiment the device for bringing the food items to an under-cooled state in salt-controlled and temperature-controlled liquid is a spiral pump.

In one embodiment the device for bringing the food items to an under-cooled state in salt-controlled and temperature-controlled liquid comprises one or more cooling tanks with a spiral shaped blade mounted on a rotation axis to convey the batch of food items along the length of the tank.

In one embodiment the device for allowing temperature balancing of the fish for a predetermined time period is a conveyor.

In an embodiment of the present invention the fish is placed in final packings, such as boxes or trays after the temperature balance step and before freezing. As the items are packed after the temperature balance step the food items are fully expanded before freezing thereby preventing them from damaging by pressure during freezing.

In an embodiment of the present invention the device for bringing the food items to an under-cooled state in salt-controlled and temperature-controlled liquid is a combination of one or more cooling tanks with a spiral shaped blade mounted on a rotation axis to convey the batch of food items along the length of the tank and a spiral pump.

In an embodiment of the present invention the cooling tank or spiral pump is connected to a heat exchanger for reuse of liquid after the liquid has been used bringing the food items to an under-cooled state.

In an embodiment of the present invention a transfer means for transferring food items from the out-feed end of the cooling tank or spiral pump to the next device is either a piping device or any other conveying means for transferring both food items and liquid from the outlet of the cooling tank or spiral pump.

In an embodiment of the present invention the transfer means for transferring food items from the out-feed end of the cooling tank or spiral pump to the next device brings the items to a separation device for separating fish from liquid.

In an embodiment of the present invention the separation device for separating fish from liquid is connected to or a part of a filtering device for storing and filtering the liquid before it is pumped back into the cooling tank or spiral pump.

In one embodiment the device for storing the food items during freezing is a tray or box.

In one embodiment the device for freezing the food items in said boxes or trays is a freezer for horizontal freezing of food items in boxes or trays, such as a plate freezer.

In an embodiment of the present invention the fish is gutted and/or bled prior to the step of undercooling.

In an embodiment of the present invention the apparatus further comprises means for slaughtering fish, such as a stunner for salmon slaughtering.

In an embodiment of the present invention the apparatus further comprises means for processing the fish, such as gutting, filleting or skinning. Such a processing device can be placed between or after the sub-chilling steps.

In an embodiment of the present invention the salt concentration and set temperatures of the salt-controlled and temperature controlled solution(s) for each step in pre-cooling and/or under-cooling are based on the type of meat or species of fish, size and fat content of the fish being brought to an under-cooled state.

In an embodiment of the present invention the time for each step in under-cooling is based on the species, size, as well as the fat content of the fish and the quantity of the fish being cooled. In one embodiment, freshly caught cod, slaughtered, gutted and bled is first cooled for 40-50 minutes at a set temperature of $-1°$ C. in a solution of 3% salt concentration and then transferred to a solution of 7% salt concentration set at a temperature of $-3°$ C. preferably for about 15 minutes. Salmon has more fat content, so slaughtered, gutted and bled salmon of same size is in one embodiment cooled for 60 minutes at a set temperature of $-1°$ C. in a solution of 3% salt concentration and then transferred to a solution of 8% salt concentration set at a temperature of $-4.5°$ C. for 25 minutes.

In an embodiment of the present invention a continuous movement or agitating of the food items in the salt solution is provided during the step of bringing the food items to an under-cooled state to prevent the surface of the food items from freezing and to prevent the formation of shell or crust at the surface of it during the cooling process. The continuous movement of the food items in the solution speeds up the cooling process and allows the use of a cooling solution at a warmer temperature, such as close to the target temperature at a certain cooling step.

In an embodiment of the present invention the food items are maintained at a temperature above freezing point of the wet food item, but at or near the phase transition temperature of freezing the food items without freezing it, such as at a temperature in the range from between about $-0.5$ to about $-2°$ C. during storing, transfer and processing, such as at about $-0.5°$ C., about $-1°$ C., or about $-1.5°$ C.

In an embodiment of the present invention the temperature of the salt solution is maintained at a temperature which is at least about $1.0°$ C. higher than the freezing point of the solution, and preferably at least about $1.5°$ C. higher.

In an embodiment of the present invention the food items are brought to a homogenous temperature in the range between $-0.2$ and $-4.0°$ C., such as a temperature in the range from about $-0.5°$ C., such as from about $-0.8°$ C., such as from about $-1.0°$ C. or from about $-1.2°$ C., to about $-4.0°$ C., or to about $-3.5°$ C., such to about $-3.0°$ C., or to about $-2.5°$ C. In the present context the term "homogenous temperature" refers to equalised average temperature which is measured from 0 to 120 minutes after a cooling process.

DESCRIPTION OF VARIOUS EMBODIMENTS

The present invention will become more fully understood from the detailed description given hereinafter and the accompanying drawings which are given by way of illustration only, and thus, are not limitative of the present invention, and wherein.

Figure 1:
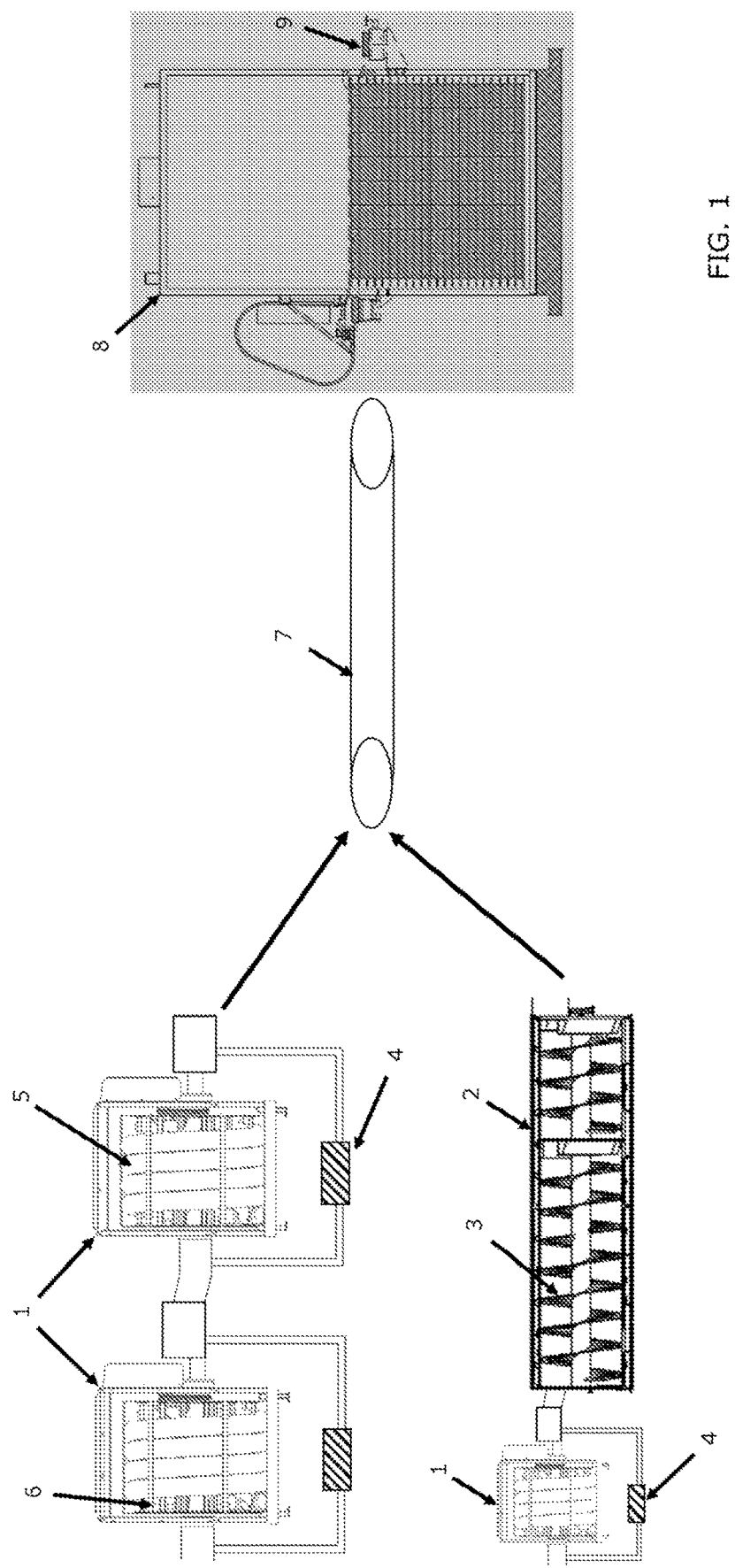
FIG. 1 is a front view of the apparatus of the present invention

FIG. 1 shows a schematic drawing of an apparatus of the present invention where the devices for performing the sub-chilling step are either (a) two parallel connected spiral pumps 1 or (b) a spiral pump 1 followed by a tank 2 with a spiral blade 3 to advance slaughtered animals or food items along the tank during treatment. In the embodiment shown in solution (b), the spiral pump 1 can be used for facilitating bleeding of freshly slaughtered fish and the two sub-chilling steps can be performed in the cooling tank 2 with a the rotating spiral blade 3. Such a cooling tank is provided with heat exchange elements 4 and sensors (not shown) to provide a constant temperature and salt concentration during the process. The spiral pumps 1 have a helical wound tubing 5 around a frame 6 for transporting and treating slaughtered animals or food items in liquid. After the sub-chilling step the items are delivered to a device for temperature balancing 7, such as a conveyor belt in this case. The devices for performing the sub-chilling steps of the present invention are designed for treating the food items, such as fish, in a salt controlled and temperature controlled solution providing agitation or movement of the food items during the cooling process. The temperature balancing device is provided to allow the food items to rime or temperature balance before they are frozen. This will allow the temperature at the surface of the food items to penetrate the food items. The food items are then placed in packings for freezing after temperature balancing, which leaves the food items fully expanded before freezing. In this embodiment the freezer 8 is a plate freezer with automatic in-feeding for trays. By further providing trays 9 or lateral packing units, the food items will not be pressure damaged during freezing.

Figure 2:
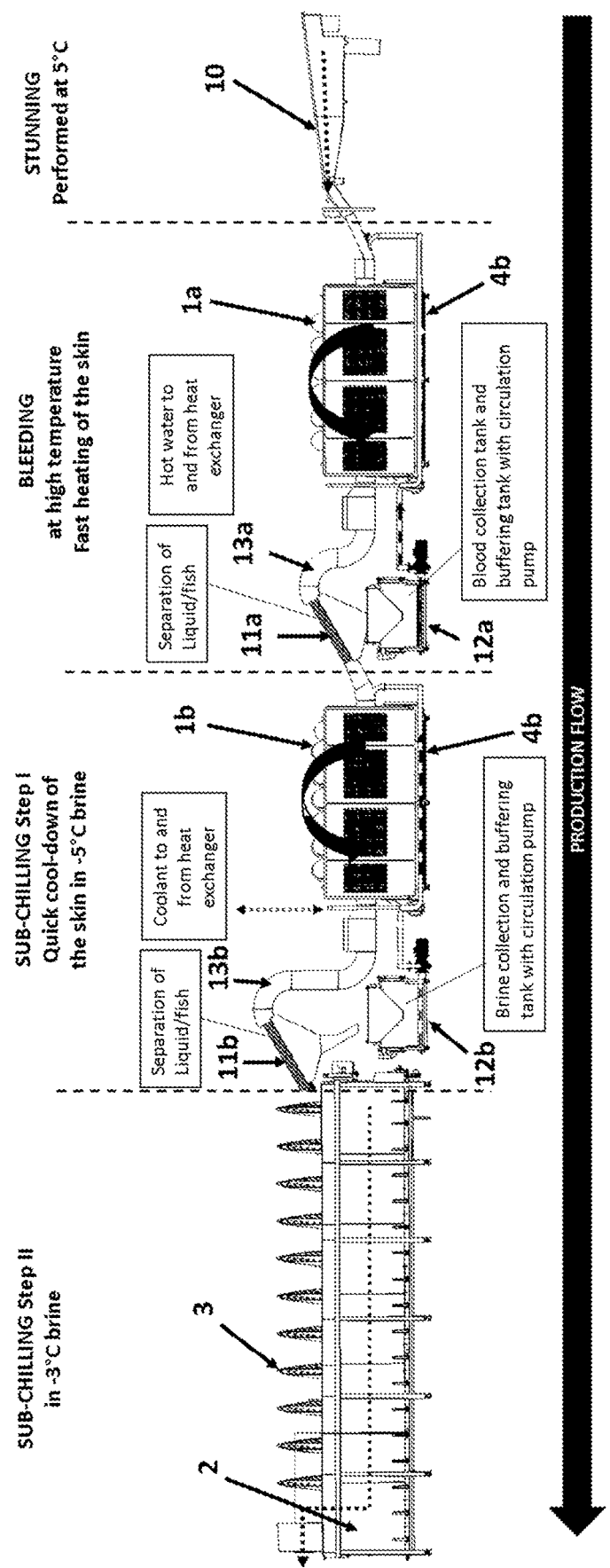
FIG. 2 is perspective drawing of an apparatus according to one embodiment of the present invention.

FIG. 2 shows the steps of the method of the present invention up to the temperature balancing and the devices used to perform the method steps in an embodiment of slaughtering fish such as salmon. The steps of temperature balancing, placing the fish in boxes or trays and freezing are not shown. The fish is pumped or transported to a stunner 10 where the fish is stunned at 5° C. After stunning the fish is transported through piping into a first spiral pump 1a to facilitate bleeding of the fish in higher temperatures for a short time, such as up to 40-50° C. The spiral pump 1a receives warm liquid from a heat exchanger 4a and the warm water facilitates the bleeding steps as does the flow if the liquid against the fish in the rotating spiral tubing. When the fish and the liquid in each winding of the spiral pump is pumped out of the spiral pump 1a, the content is pumped through piping 13a to a separation device 11a where the liquid is separated from the fish and the fish enters the second spiral pump 1b, whereas the liquid is filtered in a collection tank 12a for blood and warm liquid for filtering and circulation back through a heat exchanger 4a and back into the spiral pump for continued bleeding. The fish entering the second spiral pump 1b are subjected to a short period of cool down as the first step of the sub-chilling method in 5° C. brine, where the cold brine facilitates rapid cooling of the fish together with the flow if the liquid against the fish in the rotating spiral tubing. When the fish and the liquid in each winding of the spiral pump 1b is pumped out of the spiral pump 1a b, the content is pumped through piping 13b to separation device 11b where the liquid is separated from the fish and the fish enters the cooling tank 2 with a spiral shaped blade 3, whereas the liquid is filtered in a collection tank 11b for brine for filtering and circulation back through a heat exchanger 4b and back into the spiral pump 1b for continued sub-chilling of fish. The second sub-chilling step is performed in the cooling tank 2 before the fish is transferred to means for allowing the fish to rime in a temperature balancing step followed by freezing (not shown).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. A method for freezing food items, said method comprising:
   a) receiving food items,
   b) bringing the food items to an under-cooled state in salt-controlled and temperature-controlled liquid in at least one first container by:
      i) determining the salt concentration of the liquid and maintaining the temperature of the liquid such that the temperature is higher than the freezing point of the liquid, and
      ii) providing substantially continuous movement of the food items in the liquid during the step of bringing the food items to an under-cooled state,
   c) subjecting the food items to a temperature balancing step to allow the food items to rime before freezing the food items,
   d) transferring the food items to a receptacle for freezing, and e) bringing the food items to a temperature between −4 and −24° C. for storage before processing, wherein step c) is performed after bringing the food items to an under-cooled state and prior to freezing the food items.

2. The method of claim 1, wherein the food items are undercooled in step b) until the food items have reached a homogenous temperature within a range from about −3° C. to about −0.1° C.

3. The method according to claim 1, wherein the step b) is performed in a salt-controlled and temperature-controlled solution in at least two steps comprising:
   i) placing the food items in first salt-controlled and temperature controlled liquid having a salt concentration in the range from 0.1 to 10% and a temperature in the range from +1 to −3° C., where the salt concentration and set temperatures of the salt-controlled and temperature controlled liquid brings the homogenous temperature of the food items to +2 to −1° C., and
   ii) transferring the food items to a second salt-controlled and temperature controlled liquid having a salt concentration in the range from 1 to 20% and a temperature in the range from −1 to −12° C., where the salt concentration and set temperatures of the salt-controlled and temperature controlled liquid brings the homogenous temperature of the food items to −0.1 to −3° C.

4. The method of claim 1, wherein the food item is selected from fish, chicken, beef, pork and lamb meat products.

5. The method of claim 4, wherein the food item is fish comprising salmon, trout, cod, haddock, pollock, catfish, ling, blue ling, tusk, monkfish, carp, bass, bream, turbot, sea bass, sole, milkfish, grey mullet, grouper, sea bream, halibut, flounder, or Japanese flounder.

6. The method according to claim 5, wherein the fish is gutted and/or bled prior to step b) wherein the fish is bled in a tank or spiral pump.

7. The method according to claim 5, wherein the fish is placed in final packings after the temperature balance step and before freezing.

* * * * *